(12) United States Patent
Pettinger

(10) Patent No.: US 10,215,090 B2
(45) Date of Patent: Feb. 26, 2019

(54) COMBUSTION ENGINE LINKAGE SYSTEMS

(71) Applicant: Board of Regents, The University of Texas System, Austin, TX (US)

(72) Inventor: Wesley E. Pettinger, Richardson, TX (US)

(73) Assignee: Board of Regents, The University of Texas System, Austin, TX (US)

(*) Notice: Subject to any disclaimer, the term of this patent is extended or adjusted under 35 U.S.C. 154(b) by 205 days.

(21) Appl. No.: 15/201,988

(22) Filed: Jul. 5, 2016

(65) Prior Publication Data

US 2017/0002733 A1 Jan. 5, 2017

Related U.S. Application Data

(60) Provisional application No. 62/188,573, filed on Jul. 3, 2015.

(51) Int. Cl.
*F02B 75/04* (2006.01)
*F02B 41/04* (2006.01)
*F16C 7/02* (2006.01)

(52) U.S. Cl.
CPC ............ *F02B 75/045* (2013.01); *F02B 41/04* (2013.01); *F16C 7/023* (2013.01)

(58) Field of Classification Search
CPC .... F02B 75/045; F02B 41/04; F02B 2275/36; F16C 7/023
See application file for complete search history.

(56) References Cited

U.S. PATENT DOCUMENTS

| 1,901,263 | A | * | 3/1933 | Severin | F02B 75/045 |
| | | | | | 123/78 F |
| 4,538,557 | A | * | 9/1985 | Kleiner | F02B 75/048 |
| | | | | | 123/197.4 |
| 6,561,142 | B2 | | 5/2003 | Moteki et al. | |
| 8,087,390 | B2 | | 1/2012 | Hiyoshi et al. | |
| 8,100,097 | B2 | | 1/2012 | Takahashi et al. | |

FOREIGN PATENT DOCUMENTS

JP 2009-85187 A * 4/2009

OTHER PUBLICATIONS

Fireball—Installation Instructions for Hall Effect Sensor and Crank Trigger System (Part Nos. 9000-1000, 9000-1100, & 9000-1101), Sep. 2000, 12 pages, 9000-1011B REV A, Crane Cams (available at http://www.cranecams.com/uploads/instructions/9000-1011b.pdf).

* cited by examiner

*Primary Examiner* — Kevin A Lathers
(74) *Attorney, Agent, or Firm* — Thomas | Horstemeyer, LLP

(57) ABSTRACT

Combustion engine linkage mechanisms providing a longer piston stroke enabling high compression ratios without compromising the size or weight of the engine. The mechanisms accommodate different engine compression and expansion ratios to optimize thermodynamic efficiency for different loading conditions on demand.

22 Claims, 10 Drawing Sheets

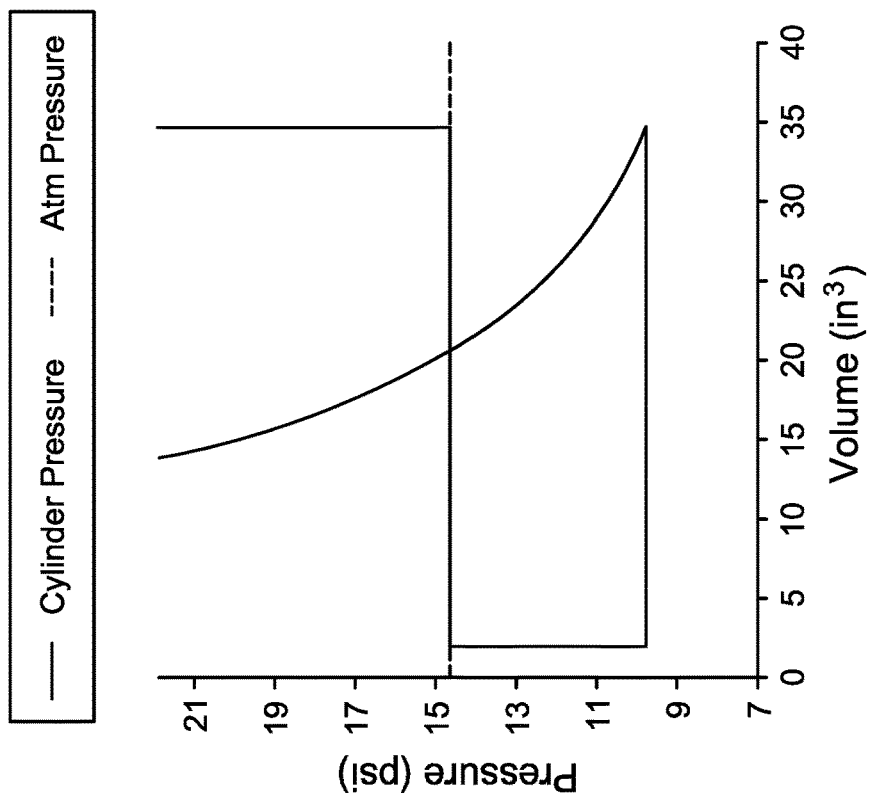
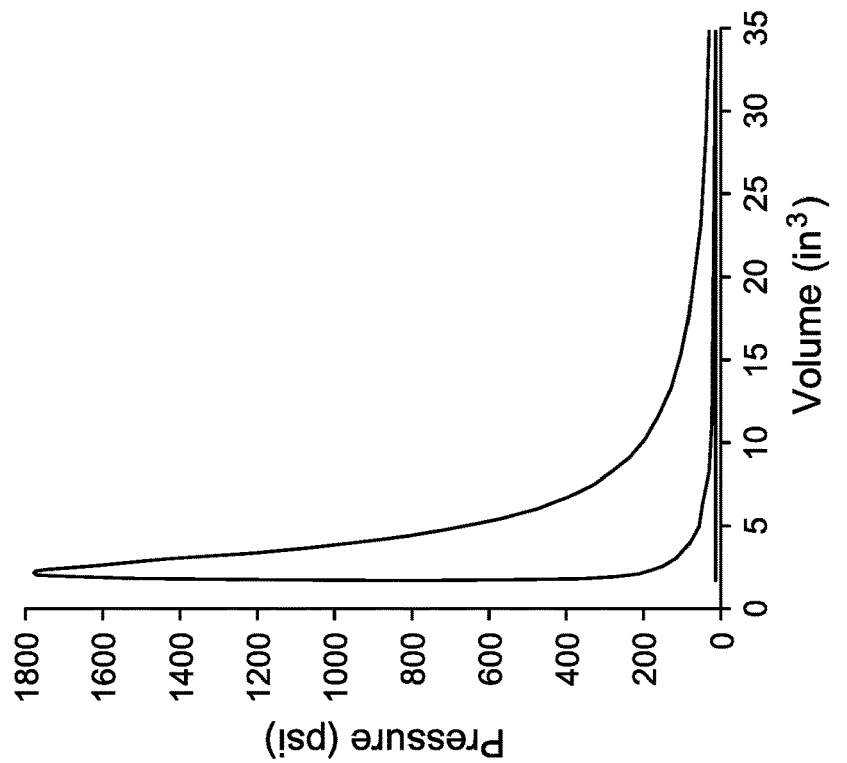
FIG. 9B
FIG. 9A

COMBUSTION ENGINE LINKAGE SYSTEMS

CROSS-REFERENCE TO RELATED APPLICATIONS

This application claims priority to U.S. Provisional Patent Application No. 62/188,573, filed on Jul. 3, 2015, titled "Multi-Link Combustion Engine." The entire disclosure of Application No. 62/188,573 is hereby incorporated herein by reference.

STATEMENT REGARDING FEDERALLY SPONSORED RESEARCH

Not applicable.

TECHNICAL FIELD OF THE INVENTION

The present disclosure relates generally to the field of internal combustion engines. More particularly, the disclosure relates to a linkage mechanism that connects the piston to the crankshaft to provide a long piston stroke enabling a high compression ratio/high expansion ratio internal combustion engine without having to compromise on the size or the weight of the engine.

BACKGROUND

In four-stroke internal combustion engines, the power dissipated in the thermodynamic cycle of an air-fuel mixture is harnessed by the linear motion of a piston. A connecting rod translates this linear motion of the piston into the rotary motion of the crankshaft. This conversion of motion is applied to derive useful work that is later transferred into different drive mechanisms.

Having a longer piston stroke helps in achieving a higher compression ratio of the working substance. This is desirable as it produces better thermodynamic efficiency in low speed engines and a much higher power output in high speed engines. However, as the conventional connecting rod is a single link mechanism, the length of the stroke is limited due to geometrical limitations when the connecting rod may come in contact with the side wall of the cylinder in which the piston reciprocates. Lengthening the connecting rod is not an option in many cases as it complicates the design of the engine by making it bulky and a lot heavier, which usually renders moot the design trade-off.

In some prior multi-link engine designs, the designs subject the components to high tension and stress conditions while providing little gain in useful work compared to conventional engine designs. In other prior multi-link engine designs, the designs include a complex mechanism with an increased number of linkage members and a linkage activation assembly.

A need remains for improved internal combustion engine linkage systems that overcome the drawbacks of conventional designs and offer optimized thermodynamic efficiency for use with modern fuels and multiple engine applications.

SUMMARY

According to an aspect of the invention, an engine includes a crank pin; an engine block body comprising at least one cylinder; a piston disposed within the at least one cylinder and configured to move back and forth inside the cylinder; and a linkage; wherein the piston is operatively coupled to the crank pin via the linkage; the linkage comprising: a first link having a longitudinal axis and a first end operatively coupled to the piston and a second end operatively coupled to a first end of a second link; the second link having a longitudinal axis and a second end operatively coupled to a first end of a third link; the third link having a longitudinal axis and a second end coupled to the engine block body; and a fourth link having a longitudinal axis and a first end operatively coupled to the second link at a point between the first and second ends of the second link, the fourth link including a counterweight disposed thereon, and the fourth link being coupled to the crank pin at a point between the first end of the fourth link and the counterweight disposed thereon; and wherein the at least one cylinder is configured with a reduced wall portion at an end thereof providing a clearance between the first link and the cylinder wall as the link moves with the piston within the at least one cylinder.

According to another aspect of the invention, an engine includes a crank pin; an engine block body comprising at least one cylinder; a piston disposed within the at least one cylinder and configured to move back and forth inside the cylinder; and a linkage; wherein the piston is operatively coupled to the crank pin via the linkage; the linkage comprising: a first link having a longitudinal axis and a first end operatively coupled to the piston and a second end operatively coupled to a first end of a second link; the second link having a longitudinal axis and a second end operatively coupled to a first end of a third link; the third link having a longitudinal axis and a second end coupled to the engine block body at a connection node, such that the node is fixed in translational motion and free in rotary motion; and a fourth link having a longitudinal axis and a first end operatively coupled to the second link at a point between the first and second ends of the second link, the fourth link including a counterweight disposed thereon, and the fourth link being coupled to the crank pin at a point between the first end of the fourth link and the counterweight disposed thereon; and wherein the second link is shorter in length than the first and third links along their respective longitudinal axes.

According to another aspect of the invention, an engine includes a crank pin; an engine block body comprising at least one cylinder configured to sustain an internal combustion cycle; a piston disposed within the at least one cylinder and configured to move back and forth inside the cylinder; and a linkage; wherein the piston is operatively coupled to the crank pin via a linkage; the linkage comprising: a first link having a longitudinal axis and a first end operatively coupled to the piston at a connection node N1 and a second end operatively coupled to a first end of a second link at a connection node N2, wherein node N1 and N2 are free in translational motion and in rotary motion; the second link having a longitudinal axis and a second end operatively coupled to a first end of a third link at a connection node N4, wherein node N4 is free in translational motion and in rotary motion; the third link having a longitudinal axis and a second end coupled to the engine block body at a connection node N5, such that node N5 is fixed in translational motion and free in rotary motion; and a fourth link having a longitudinal axis and a first end operatively coupled to the second link at a connection node N3 between the first and second ends of the second link, the fourth link including a counterweight disposed thereon, and the fourth link being coupled to the crank pin at a connection point between connection node N3 and the counterweight disposed on the fourth link; and wherein the connection point is fixed in translational motion and free in rotary motion.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 9A and 9B are graphs of a pressure-volume plot for an engine according to an embodiment;

DETAILED DESCRIPTION

Figure 1:
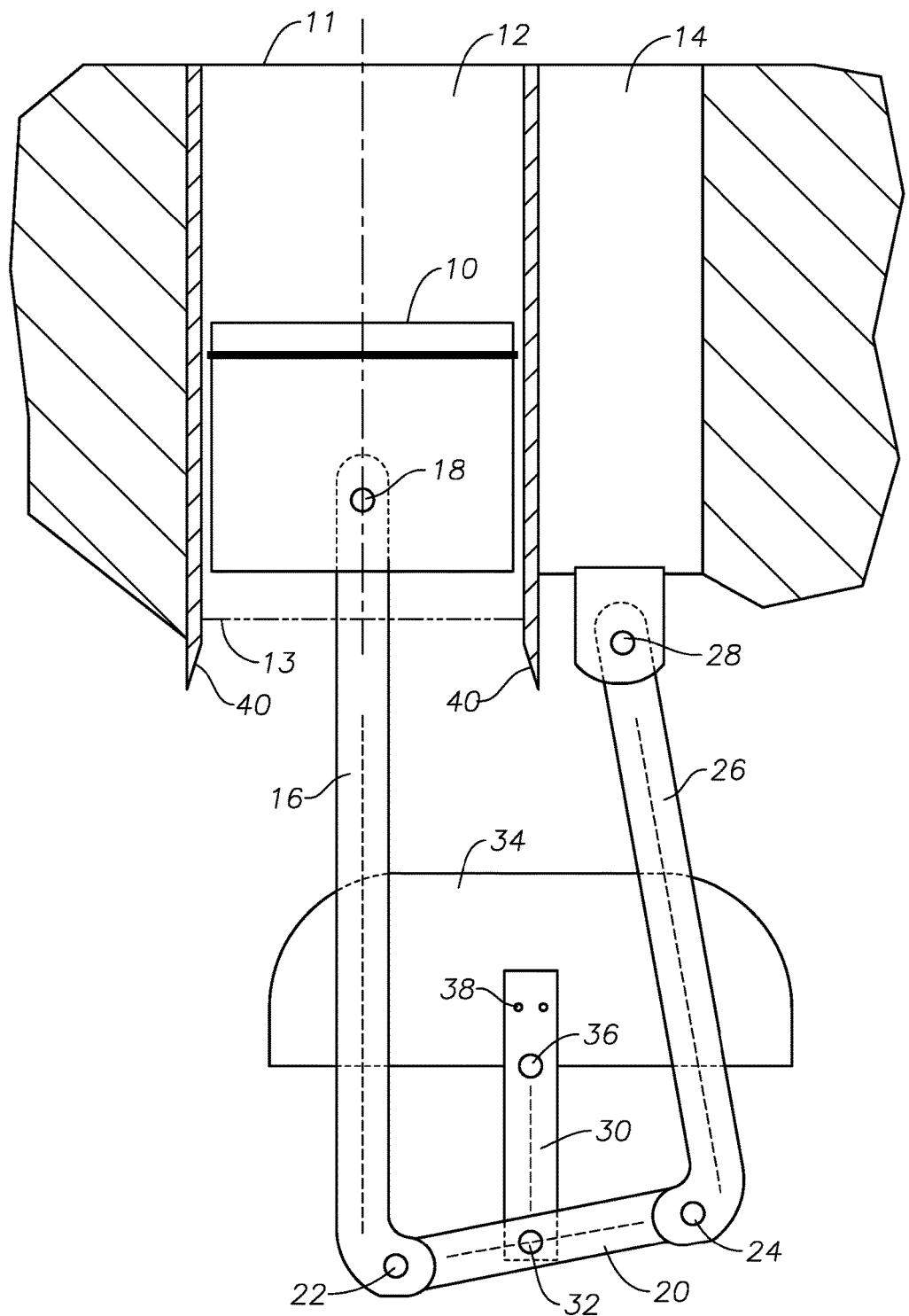
FIG. 1 is a schematic diagram of an engine linkage system according to an embodiment.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "couple" or "couples" is intended to mean either an indirect or direct connection. Thus, if a first device couples to a second device, that connection may be through a direct connection, or through an indirect connection via other devices and connections. The term "operatively coupled" or "operatively couples" is intended to mean a coupling permitting motion and/or movement (e.g., rotational, translational, extension) of or among the components forming the coupling.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. It will also be appreciated that the parts and component dimensions of the embodiments disclosed herein may not be drawn to scale.

FIG. 1 illustrates an embodiment of an engine linkage mechanism of the invention. A piston 10 is housed within a cylinder 12 in the engine block body 14. Engine embodiments of the invention may be implemented with a plurality of cylinders and pistons (each cylinder having a respective piston), and in various configurations (e.g., V-block, opposing cylinders, in-line cylinders, etc.). For clarity of illustration, a single cylinder 12 embodiment is shown. The piston 10 is coupled to one end of a first link 16. The first link 16 is an elongated member with a hole formed at each end to accommodate a pin. At one end (a first end), the first link 16 is coupled to the piston 10 via a pin 18 allowing the link to pivot about the pin axis while securely holding the piston affixed to the link. At the other end (second end), the first link 16 is coupled to a first end of a second link 20 with another pin 22 engaging a hole that is formed in the first end of the second link 20. In some embodiments, the hole on the first link 16 for engaging pin 18 is formed with its center aligned with the longitudinal axis (shown as a dotted line) of the first link 16, and the hole on the first link 16 for engaging pin 22 is formed with its center set off from the longitudinal axis of the first link 16, as depicted in FIG. 1. In such embodiments, the holes formed in the ends of the first link 16 are referred to as offset or eccentric with respect to each other.

The second link 20 is an elongated member with a hole in its first end engaging pin 22 as mentioned and another hole formed on its second end, i.e., opposite the end having the hole engaging pin 22. A third link 26 is coupled to the second link 20 with a pin 24 engaging a hole formed on the first end of the third link and passing through the correspondingly located hole at the second end of the second link 20. The third link 26 is an elongated member with another hole, engaged by a pin 28, formed at the second end of third link 26, opposite the end thereof having the hole engaged by pin 24. In some embodiments, the hole on the third link 26 for engaging pin 28 is formed with its center aligned with the longitudinal axis (shown as a dotted line) of the third link 26, and the hole on the third link 26 for engaging pin 24 is formed with its center set off from the longitudinal axis of the third link 26, as depicted in FIG. 1. In such embodiments, the holes formed in the ends of the third link 26 are referred to as offset or eccentric with respect to each other.

Figures 5A, 5B:
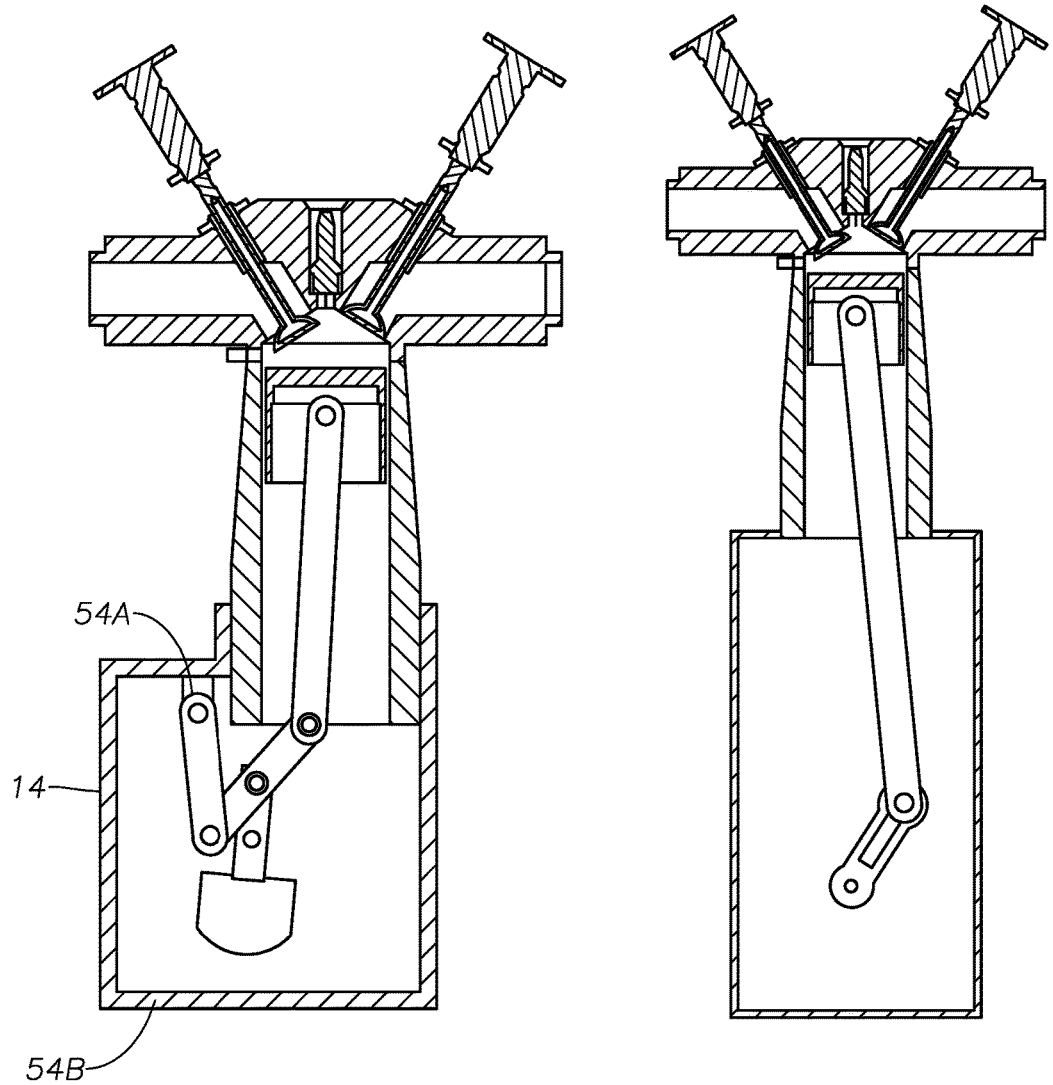
FIG. 5A is a schematic diagram of an engine according to an embodiment.
FIG. 5B is a schematic diagram of a conventional engine.

The second end of the third link 26, having the hole engaged by pin 28, is connected to the engine block body 14 by pin 28, which also passes through a matching hole formed on the block body 14 to receive the pin 28. With this coupling directly to the engine block body 14, this second end of the third link 26 is free to pivot (rotate) about the connecting pin 28 axis, but the link is prevented or restrained from translation. The third link 26 is coupled to the engine block body 14 such that its longitudinal axis lies in the same plane as the longitudinal axis of the first link 16. As depicted in FIG. 1, coupled links 16, 20, and 26 form a substantially U-shaped configuration, with the first link 16 being the longest of links to provide a maximum piston 10 stroke within the cylinder 12. As seen in and described below with respect to FIGS. 3A-3D, the substantially U-shaped configuration varies somewhat during operation of the linkage mechanism. As further depicted in FIG. 1, the third link 26 may be shorter than the first link 16 and longer than the second link 20. As also seen in FIG. 1, the second end of the third link 26 is connected to the engine block body 14 by pin 28 at a portion of the engine block body that is near or adjacent the cylinder 12, or more particularly, near or adjacent the bottom dead center 13 position of the piston 10/cylinder 12. In some other embodiments, the second end of the third link 26 may be connected to the engine block body 14 by pin 28 at a portion of the engine block body that is distant from the cylinder 12. For example, the second end of the third link 26 may be connected to the engine block body 14 at a portion 54B thereof, located at the bottom of the engine block body 14, in FIG. 5A, rather than being connected to the engine block body 14 at a portion 54A thereof, located adjacent the cylinder 12, as shown in FIG. 5A. In such other embodiments, the linkage mechanism would not have a substantially U-shaped configuration.

A fourth link 30 is an elongated member coupled at a first end thereof to second link 20 and at a second end thereof to a counterweight 34. The coupling of the fourth link 30 to the second link 20 occurs intermediate the two ends of second link 20. Specifically, a hole is formed on the second link 20 between the two ends thereof to engage a pin 32 to couple the second link to the first end of the fourth link 30, via a hole formed at the first end of the fourth link 30. The coupling of the fourth link 30 to counterweight 34 occurs at coupling point 38. The counterweight 34 is preferably made of metal, but it may be formed of any suitable material as known in the art. It may also be mounted to the fourth link 30 using any suitable techniques as known in the art (e.g., welded, via fasteners, etc.). In some embodiments, the fourth link 30 may be formed as a single piece, with the counterweight being formed as part of the link member. As illustrated in FIG. 1, the longitudinal axis (shown as a dotted line) of the second link 20 and the longitudinal axis (shown as a dotted line) of the fourth link 30 lie in separate planes parallel to one another.

The fourth link 30 is coupled to the crank pin 36 of the crankshaft at a connection point between the point at which the fourth link 30 is coupled to the counterweight 34 and the point (pin 32) at which the fourth link 30 is coupled to second link 20. For clarity of illustration, the entire crankshaft is not shown in FIG. 1. Crank pin 36 may be understood as the end of the crankshaft that connects to the linkage mechanism within the engine body. In this manner, the counterweight 34 is not directly connected to the crankshaft, rather it is coupled indirectly via the fourth link 30. The connection of the crank pin 36 to the fourth link 30 is a rigid connection (i.e., the crank pin 36 is fixedly secured to the fourth link 30 such that any rotational movement of the fourth link 30 is directly conveyed to the crank pin 36). This rigid connection can be implemented via any suitable means as known in the art (e.g., welding the link to the pin, splined pin end engaging matching channels in the link hole, etc.). With this linkage configuration, the fourth link 30 continually rotates along with the crank pin 36 as the piston 10 cycles between top dead center 11 and bottom dead center 13 positions within the cylinder 12. In this embodiment, the center of the crankshaft does not lie along the cylindrical axis (shown by the dashed line in FIG. 1) of the cylinder 12. For simplicity, the cylindrical axis of the cylinder 12 may be referred to herein as the axis of the cylinder.

Figure 2:
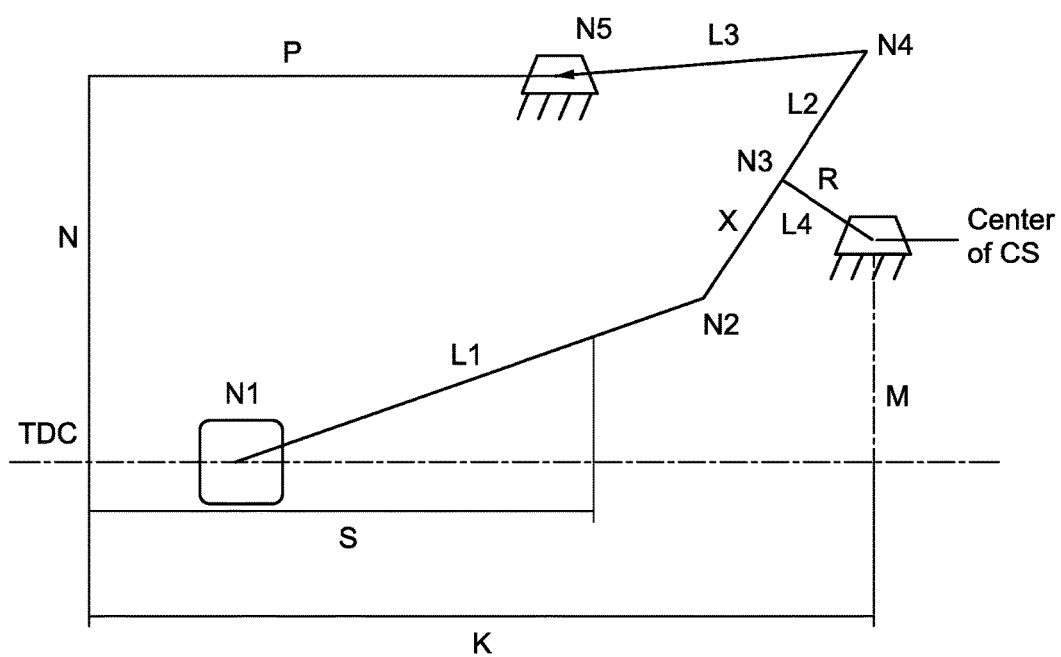
FIG. 2 is a kinematics diagram of the linkage system of FIG. 1.

Turning to FIG. 2, a kinematics diagram of the linkage of FIG. 1 is illustrated. Links 16, 20, 26, and 30 are correspondingly denoted as L1-L4. The linkage connection points are depicted as nodes N1 (between L1 and piston), N2 (between L1 and L2), N3 (between L2 and L4), N4 (between L2 and L3), and N5 (between L3 and engine block body). The nodes connect the links such that they are free to rotate and translate; only N5 and the center of the crankshaft crank pin are restrained in translation. It will be appreciated by those skilled in the art that the connections of the linkage mechanism disclosed herein can be implemented using any suitable means, e.g., any suitable pin means, as known in the art. In some embodiments, conventional snap rings or C-Clips are used to retain the pins within the respective connection points. It will also be appreciated that the pins may be outfitted with any suitable bearing means as known in the art to facilitate rotational movement at the respective connection (e.g., roller bearing, journal bearings, etc.). Engine embodiments may be implemented with any suitable lubrication systems as known in the art (e.g., splash/bath systems, pressurized oil systems, etc.).

As illustrated in FIG. 2, N1 connects to N2 to form link L1. N4 connects to N5 to form link L3. N2 connects to N4 to form link L2. Along the length of L2, at a distance ("X") from N2, is the node N3, which connects to the crank pin via link L4 at a radius (R) from the center of the crank pin. K, while drawn parallel to the axis of the cylinder, equals the distance along the axis of the cylinder from the piston top dead center to the center of the crank pin. M is the lateral distance from the center of the crank pin to the axis of the cylinder. P and N are the similar lengths for the position of node N5 as related to the piston top dead center. S is the piston stroke.

Figure 3A:
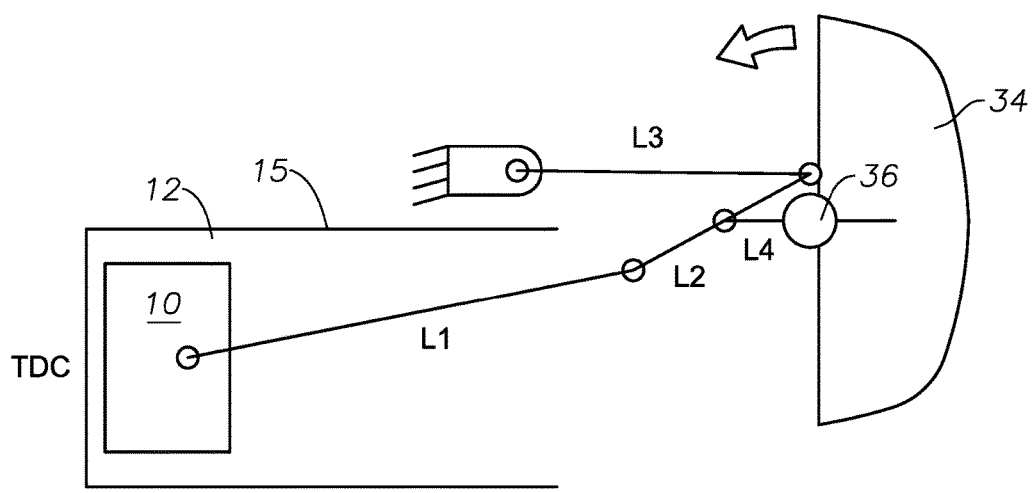
FIG. 3A is a schematic diagram of a linkage mechanism during a point in a cycle sequence according to an embodiment.
Figure 3B:
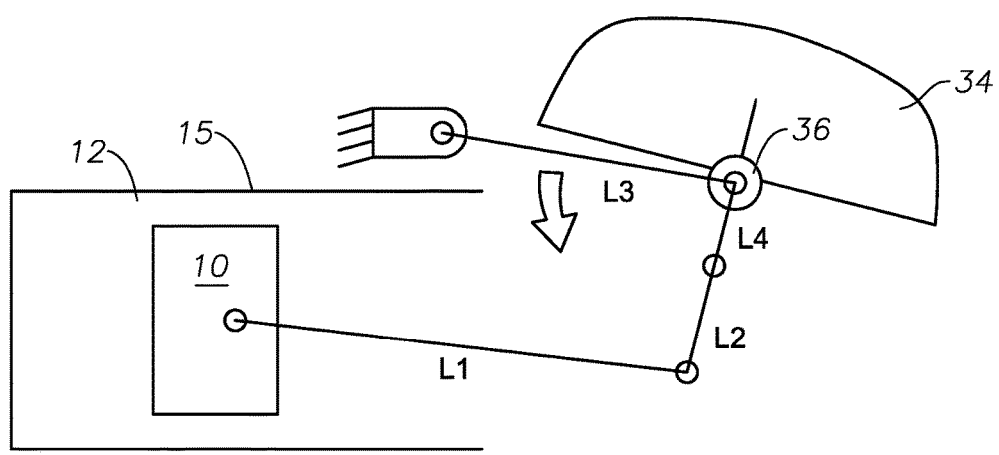
FIG. 3B is a schematic diagram of another point in the cycle sequence of the linkage mechanism of FIG. 3A.
Figure 3C:
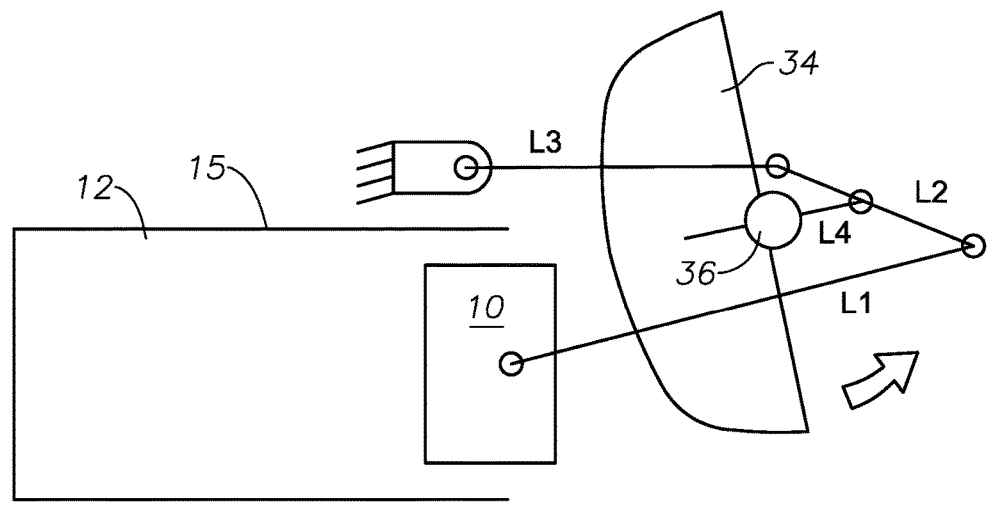
FIG. 3C is a schematic diagram of another point in the cycle sequence of the linkage mechanism of FIG. 3A.
Figure 3D:
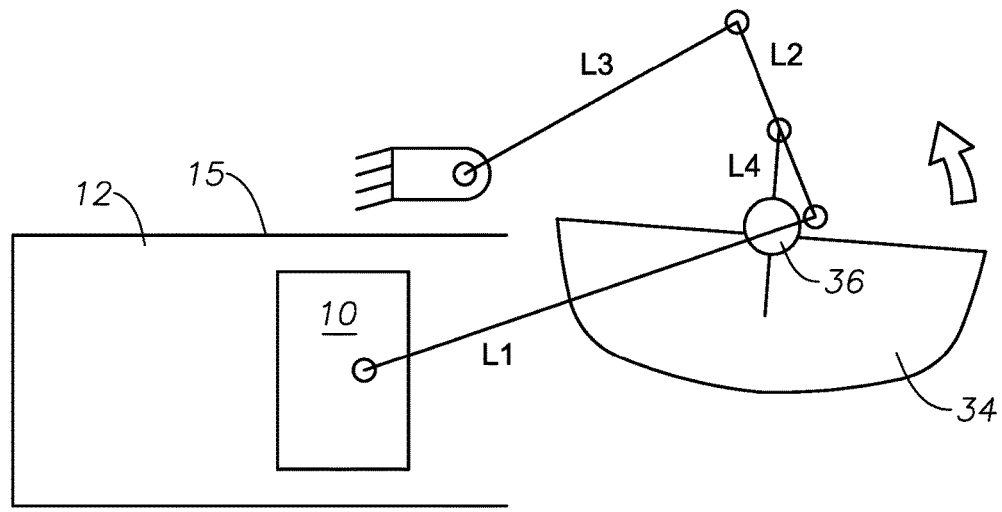
FIG. 3D is a schematic diagram of another point in the cycle sequence of the linkage mechanism of FIG. 3A.

FIGS. 3A-3D represent the motion of the linkage mechanism of the invention during one complete rotation of the crank pin. FIG. 3A shows the mechanism when the piston is at top dead center. FIG. 3B shows the linkage position during translation of the piston towards bottom dead center. FIG. 3C shows the position of the mechanism when the piston is at bottom dead center. FIG. 3D shows the linkage position as the piston translates from bottom dead center back to top dead center during the cycle.

Figure 4A:
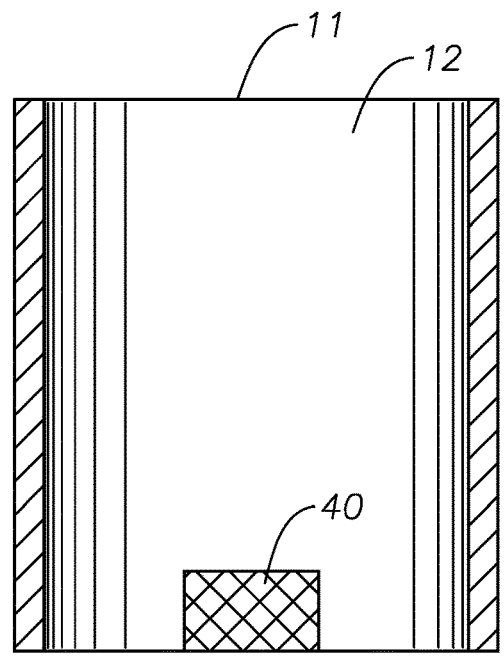
FIG. 4A is a schematic diagram of a cylinder wall according to an embodiment.
Figure 4B:
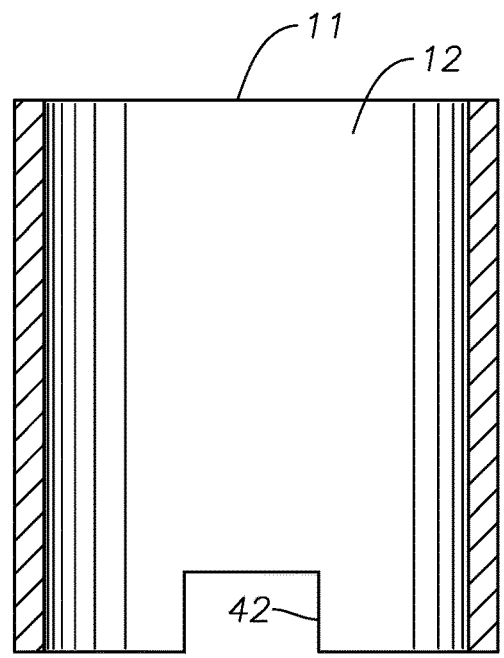
FIG. 4B is a schematic diagram of another cylinder wall according to an embodiment.

As depicted in FIGS. 3A-3D, during the described piston transitions, link L1 (representing first link 16 in FIG. 1) pivots about its connection points (N1, N2) in a manner that brings the first link 16 very close to the cylinder wall 15 near the open or bottom end of the cylinder 12 (near bottom dead center). In some embodiments, any risk of contact between the first link 16 and the cylinder wall 15 is prevented by configuring the cylinder wall 15 with a reduced wall portion providing a clearance to accommodate the range of displacement (in the direction perpendicular to the axis of the cylinder 12) of the first link 16 as it comes close to the cylinder 12 wall during the piston transitions. FIGS. 4A and 4B illustrate cylinder embodiments with these reduced wall portions 40 and 42, respectively. As seen in FIGS. 4A and 4B, reduced wall portions 40, 42 are formed at the open end of cylinder 12 (which is the bottom end of cylinder 12 shown in FIGS. 4A and 4B). In FIG. 4A, the reduced wall portion 40 is a tapered wall portion (shown only schematically in FIG. 4A). FIG. 1 illustrates the reduced wall portion 40 from a side view. As seen in FIG. 1, at the reduced wall portion 40, the interior wall of cylinder 12 tapers radially outward (i.e., away from the axis of the cylinder 12, this axis being shown by the dotted line) as the wall of cylinder 12 extends toward the open end of the cylinder 12 (i.e., as the wall of cylinder 12 extends downward in FIGS. 1 and 4A). FIG. 4B illustrates another cylinder 12 embodiment wherein the reduced wall portion 42 is achieved via a cut-out formed in the cylinder wall end. Although each of reduced wall portions 40 and 42 is illustrated as having a rectangular shape, embodiments can be configured in which reduced wall portion(s) 40 and/or 42 is (are) formed in another shape (other shapes), e.g., an oval(s) or another curved configuration(s). Such configurations may but need not be regular or symmetric shapes. The dimensions of the reduced wall portions 40, 42 shown in FIGS. 4A and 4B are not necessarily drawn to scale; the portions 40, 42 can be formed larger or smaller than shown. Cylinder 12 embodiments can be configured with one reduced wall portion 40 or 42, or with two reduced wall portions 40 and/or 42, in which case one reduced wall portion may be formed directly across from the other. The location of any reduced wall portion 40 or 42 may but need not be near engagement pin 28, as shown in FIG. 1. Engine embodiments can be configured with the cylinder 12 having its open end (which is the bottom end as shown in FIGS. 1, 4A, 4B and 5A) flush with the engine block body 14, or (as seen, e.g., in FIG. 5A) with a cylinder sleeve extending beyond the block body and into the linkage housing.

The disclosed engine design provides a number of advantages over conventional engine designs. For example, one advantage is the ability to achieve a longer stroke without having to compromise substantially on the overall volume of the engine. This helps to achieve a higher compression ratio of the working substance and thus extracts more work out of the working substance. In addition to providing a higher compression ratio compared to conventional engines of similar dimensions and weight, the longer piston stroke of the disclosed engine design translates to higher fuel efficiency and a better torque output rating for a low speed engine. On a high performance or high speed engine, this translates into higher power output.

The limited range of motion provided by the disclosed linkage mechanism facilitates the longer piston stroke and also minimizes the forces that the linkage imparts on the piston in the radial direction through the connection at pin 18 (connection node N1 in FIG. 2). (The term "radial direction" as used here is meant to include any direction perpendicular to the cylindrical axis of the cylinder 12). Minimizing the radial forces on the piston substantially reduces the amount of wear and tear on the piston rings as compared to a conventional internal combustion engine. An engine embodiment may be implemented with variable valve timing to optimize the thermodynamic efficiency of the engine for different loading conditions on demand. By varying the valve timing, engine embodiments can provide different compression and expansion ratios. For example, by respectively varying the inlet and/or exhaust valve opening period/duration, the compression and expansion ratios can be controlled. The ability to provide variable compression and expansion ratios allows engine embodiments to accommodate the use of multiple fuels (e.g., diesel, gasoline, synthetic blends). Some embodiments may also be implemented to operate with dual fuel systems (e.g., a lower grade and higher grade fuel). Embodiments implemented with direct cylinder fuel injection may further enhance the thermodynamic efficiency of the engine by eliminating pumping losses. Yet other embodiments may be implemented with variable ignition timing to further enhance and control the thermodynamic efficiency of the engine for different loading conditions. It will be appreciated by those skilled in the art that various conventional inlet and exhaust valve mechanisms, as well as variable valve timing and electronic ignition systems, may be used to implement embodiments of the invention. Similarly, it will also be appreciated that various conventional fuel injection or carburation systems may be used with implementations of the disclosed mechanisms.

Other embodiments may be derived by moving the locations of the nodes on the linkage. With reference to FIG. 2, the described linkage configuration shows link L2 having the nodes N2, N3, and N4 all positioned along the longitudinal axis of the link. Shuffling the positioning on the nodes N2, N3, N4 on the link L2 such that one or more of the nodes does not lie along the longitudinal axis of the link may result in different link dynamics and thus may be used for specific engine applications.

The lengths of the links L1, L2, and L3, the length R, the positioning of the node N5, and the relative position of N5 with respect to N1, may be altered to have several unique configurations of the linkage, yielding useful configurations of the combustion engine for different applications. For example, in some embodiments, N5 can be located on the opposite side of the crank pin with respect to the piston; or N5 can be located on any other radial position around the crank pin; or the lengths of links L1 and L3 can be varied to increase or decrease the compression characteristics for different embodiments of the combustion engine for different applications. Other embodiments may also be implemented with curved or shaped links (e.g., S-shaped or C-shaped link L2). Those skilled in the art will understand and appreciate the dynamics of the permutations, combinations and variations disclosed herein and their applicability to different kinds of engines and engine applications.

An exemplary embodiment of the engine linkage system disclosed herein was designed (hereinafter the "Pettinger Engine"), with the dimensions shown in Table 1.

TABLE 1

| Particulars | Dimensions (in) |
| --- | --- |
| Piston Stroke | 9.3 |
| Cylinder Bore | 5.166 |
| Length L1 | 11.13 |
| Length L2 | 5.137 |
| Length R | 2.099 |
| Length X | 3.098 |
| Length L3 | 5.6899 |
| Length K | 15.58 |
| Length M | 2.859 |
| Length P | 10.364 |
| Length N | 4.90 |

Figure 6:
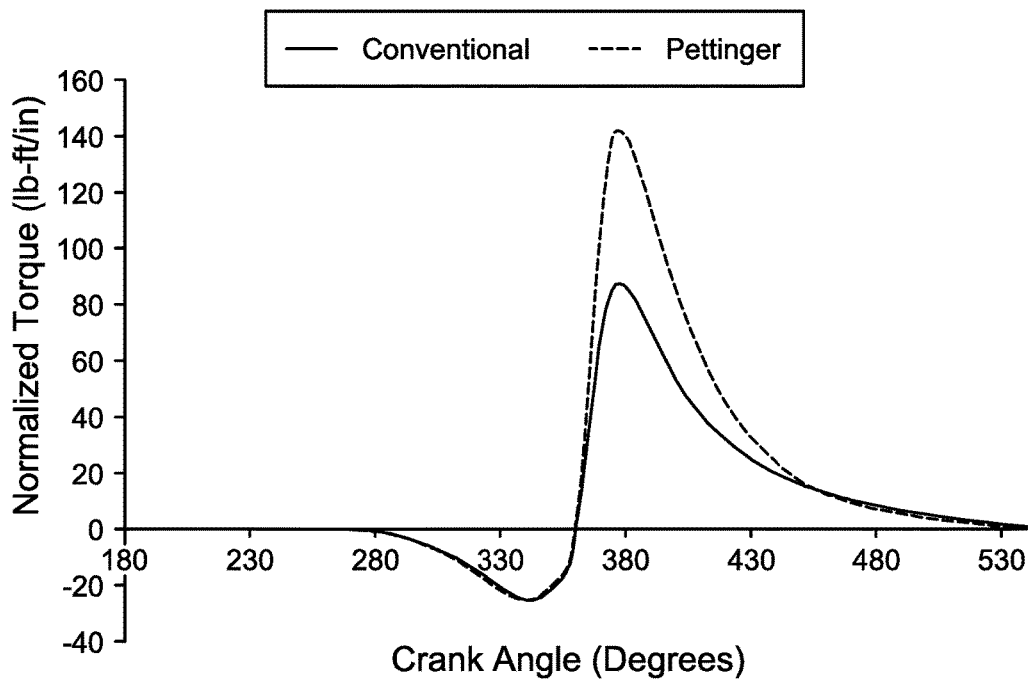
FIG. 6 is a graph of the torque comparison between a conventional engine and an engine according to an embodiment.

Performance of the Pettinger Engine was compared to that of an internal combustion engine with the conventional piston and connecting rod assembly ("Conventional Engine") of similar bore and stroke. A side-by-side comparison of the engines is shown in FIGS. 5A and 5B, with the Pettinger Engine shown in FIG. 5A, and the Conventional Engine shown in FIG. 5B. In addition to other advantages provided by the Pettinger Engine, FIGS. 5A and 5B illustrate the reduced overall engine volume of the Pettinger Engine compared to the Conventional Engine, while achieving the same stroke with the disclosed linkage mechanisms. FIGS. 5A and 5B are not shown to scale. It is noteworthy that the connecting rod of the Conventional Engine is approximately three times the length of the connecting rod of the Pettinger Engine. The engines were designed with one set of valves (i.e., inlet and exhaust) per cylinder and a fuel injector system. Engine performance analysis was run on commercially available mathematical modeling and simulation software. FIG. 6 shows the simulation results for the torque comparison between the Conventional Engine and Pettinger Engine. As shown in the graph of FIG. 6, the torque output of the Pettinger Engine was found to be approximately 1.75 times that of the Conventional Engine. The Pettinger Engine provides high torque while running at a low rate of revolutions per minute (RPM). The reduced angularity of the piston rod was demonstrated. The reduced angularity also helped drastically reduce the normalized cylinder friction. Reduced cylinder friction allows for thinner cylinder wall designs, as well as longer lasting piston rings, better lubrication, etc. Pumping losses were demonstrated to be nearly eliminated, especially while using fuel injection. Pumping loss is the wasted energy required for the piston to pull against a partial vacuum during the intake stroke. It was further noted that the pumping losses were reduced to 1% at higher throttle values. Simulations for variable valve timing for both the inlet and exhaust valves resulted in extraction of over 500 ft-lbs of torque at full throttle.

Figure 7:
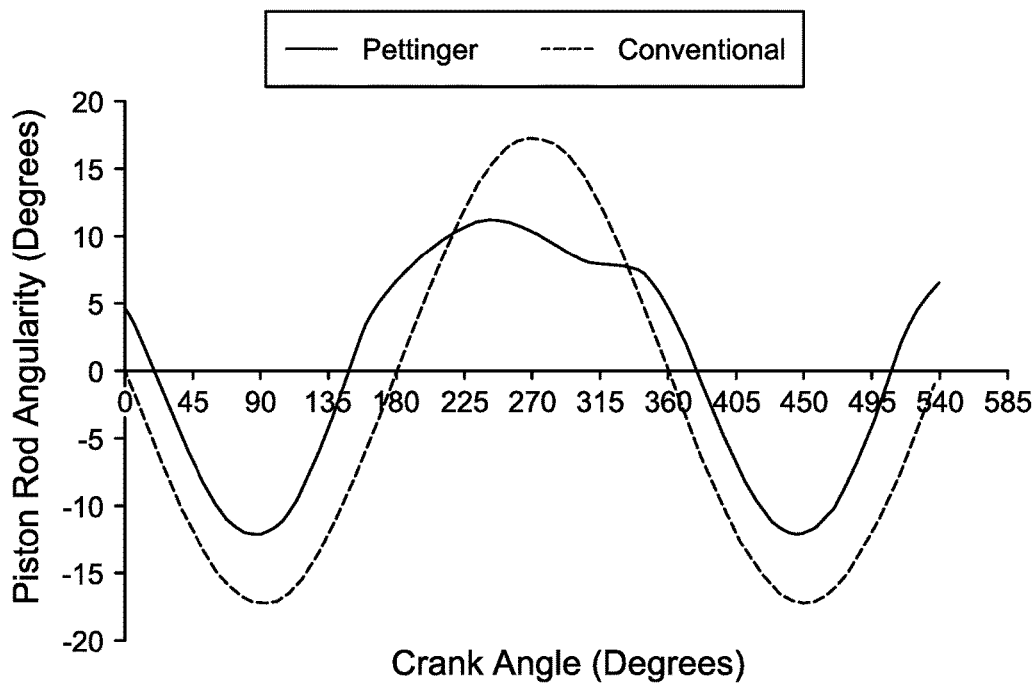
FIG. 7 is a graph of a connecting rod angularity comparison between a conventional engine and an engine according to an embodiment.
Figure 8:
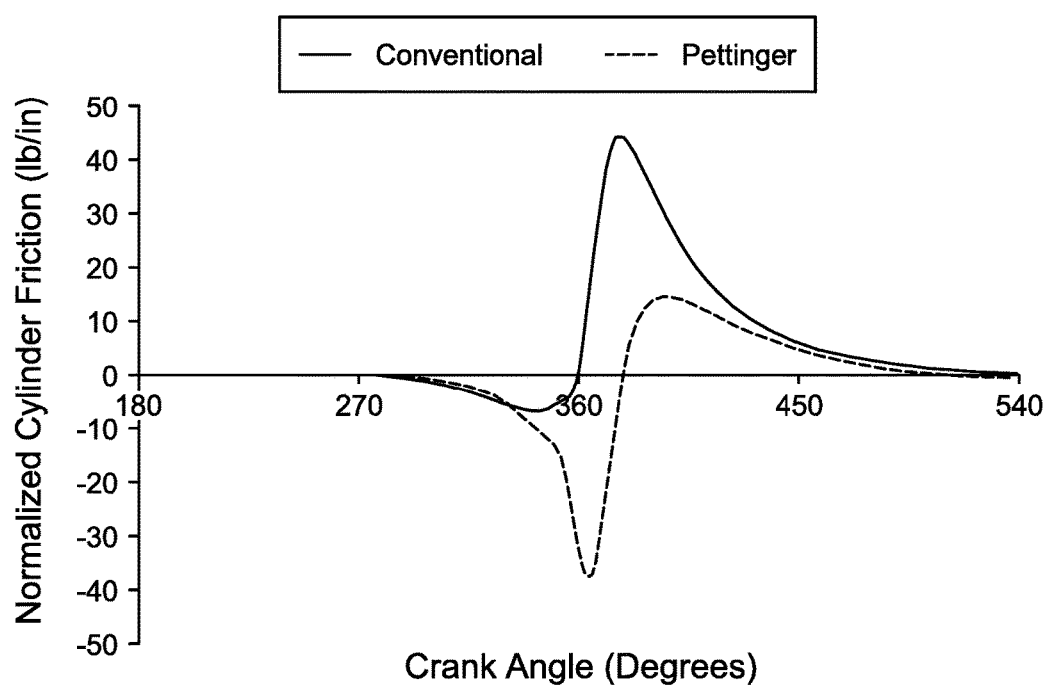
FIG. 8 is a graph of a normalized cylinder friction comparison between a conventional engine and an engine according to an embodiment.
Figure 10:
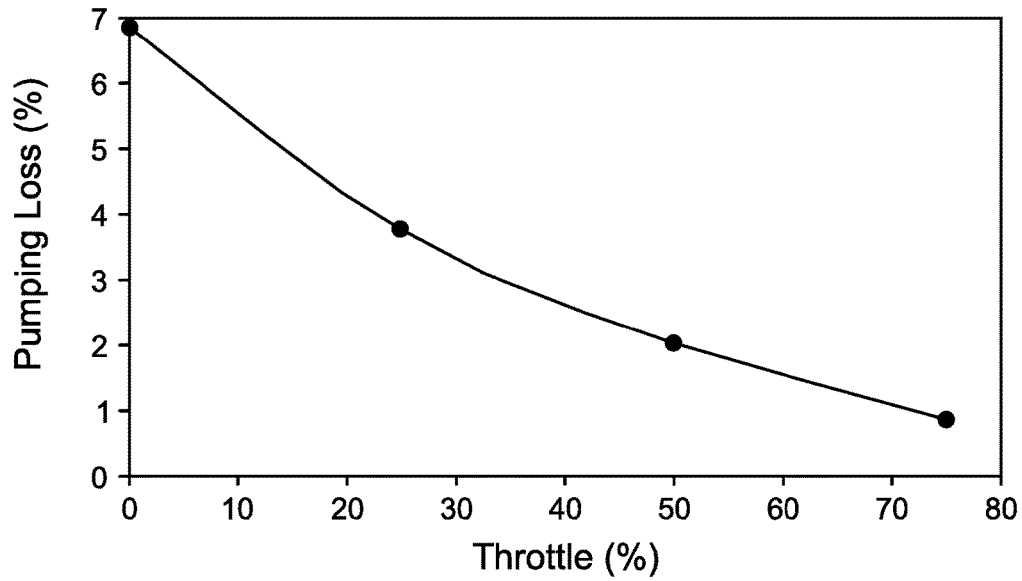
FIG. 10 is a graph of pumping loss variations for an engine according to an embodiment.
Figure 11:
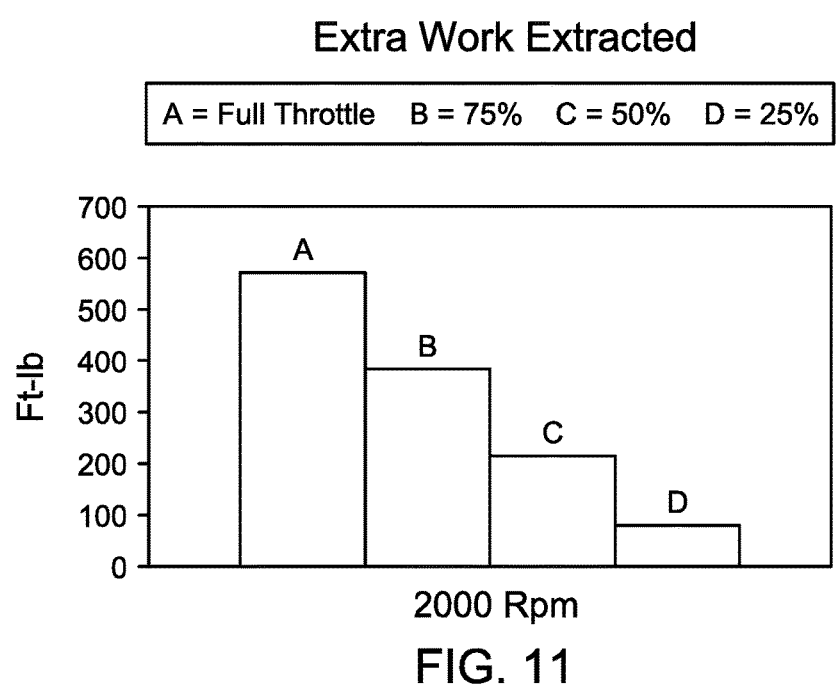
FIG. 11 is a graph of work extracted with an engine according to an embodiment.

FIG. 7 shows a comparison of link L1 angularity in the Pettinger Engine with the connecting rod angularity in the Conventional Engine. As shown in the graph of FIG. 7, link L1 of the Pettinger Engine has a substantially lower range of displacement in a direction perpendicular to the axis of the cylinder compared to the connecting rod of the Conventional Engine. FIG. 8 shows the comparison of normalized cylinder friction between the Conventional Engine and the Pettinger Engine, illustrating a significantly lower friction curve for the Pettinger Engine. FIGS. 9A and 9B show the pressure-volume plot for the Pettinger Engine, showing how the pumping losses are nearly eliminated. FIG. 9A shows the cylinder pressure versus volume at the power loop (compression, expansion, and some exhaust cycle). FIG. 9B shows the pressure versus volume zoomed in at the pumping loop (intake, exhaust, and some compression cycle) for 50% throttle. Pumping loss is determined by comparing the percentage of pumping loop area compared to the power loop area. FIG. 10 illustrates the variation of the pumping losses with the throttle in the Pettinger Engine. As shown in FIG. 10, pumping losses drop rapidly as the throttle value increases. FIG. 11 is a bar graph that shows the extra work that is extracted by incorporation of variable valve timing, at full throttle (bar A), 75% of full throttle (bar B), 50% of full throttle (bar C), and 25% of full throttle (bar D). As shown in FIG. 11, even at a relatively low RPM the Pettinger Engine displays a significant torque output. It will be appreciated by those skilled in the art that engines equipped with the disclosed linkage mechanisms may be implemented with conventional electronics and software packages to control valve timing and air-fuel mixtures.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in an embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. An engine, comprising:
a crank pin;
an engine block body comprising at least one cylinder;
a piston disposed within the at least one cylinder and configured to move back and forth inside the cylinder; and
a linkage,
wherein the piston is operatively coupled to the crank pin via the linkage, the linkage comprising:
a first link having a longitudinal axis and a first end operatively coupled to the piston and a second end operatively coupled to a first end of a second link;
the second link having a longitudinal axis and a second end operatively coupled to a first end of a third link;
the third link having a longitudinal axis and a second end coupled to the engine block body; and
a fourth link having a longitudinal axis and a first end operatively coupled to the second link at a point between the first and second ends of the second link, the fourth link including a counterweight disposed thereon, and the fourth link being coupled to the crank pin at a point between the first end of the fourth link and the counterweight disposed thereon, and wherein the at least one cylinder is configured with a reduced wall portion at an end thereof providing a clearance between the first link and the cylinder wall as the link moves with the piston within the at least one cylinder.

2. The engine of claim 1, wherein the fourth link is configured to continually rotate along with the crank pin as the piston cycles between top dead center and bottom dead center within the at least one cylinder.

3. The engine of claim 1, wherein the second end of the third link is coupled to the engine block such that the longitudinal axis of the third link lies in the same plane as the longitudinal axis of the first link.

4. The engine of claim 1, wherein the first link is greater in length than the third link along their respective longitudinal axes.

5. The engine of claim 1, wherein the longitudinal axis of the second link and the longitudinal axis of the fourth link lie in separate planes parallel to one another.

6. The engine of claim 1, wherein the second end of the third link is coupled to the engine block near the at least one cylinder such that the first, second, and third links form a U-shaped configuration.

7. The engine of claim 1, further comprising:
at least one inlet valve and at least one exhaust valve configured to respectively allow air into and exhaust out of the at least one cylinder;
wherein the timing of opening and closing of the at least one inlet or exhaust valve may be varied to achieve a desired compression ratio or expansion ratio within the at least one cylinder.

8. An engine, comprising:
a crank pin;
an engine block body comprising at least one cylinder;
a piston disposed within the at least one cylinder and configured to move back and forth inside the cylinder; and
a linkage,
wherein the piston is operatively coupled to the crank pin via the linkage, the linkage comprising:
a first link having a longitudinal axis and a first end operatively coupled to the piston and a second end operatively coupled to a first end of a second link;
the second link having a longitudinal axis and a second end operatively coupled to a first end of a third link;
the third link having a longitudinal axis and a second end coupled to the engine block body at a connection node, such that the node is fixed in translational motion and free in rotary motion; and
a fourth link having a longitudinal axis and a first end operatively coupled to the second link at a point between the first and second ends of the second link, the fourth link including a counterweight disposed thereon, and the fourth link being coupled to the crank pin at a point between the first end of the fourth link and the counterweight disposed thereon, and
wherein the second link is shorter in length than the first and third links along their respective longitudinal axes.

9. The engine of claim 8, wherein the fourth link is configured to continually rotate along with the crank pin as the piston cycles between top dead center and bottom dead center within the at least one cylinder.

10. The engine of claim 8, wherein the second end of the third link is coupled to the engine block such that the longitudinal axis of the third link lies in the same plane as the longitudinal axis of the first link.

11. The engine of claim 8, wherein the longitudinal axis of the second link and the longitudinal axis of the fourth link lie in separate planes parallel to one another.

12. The engine of claim 8, wherein the second end of the third link is coupled to the engine block near the at least one cylinder such that the first, second, and third links form a U-shaped configuration.

13. The engine of claim 8, further comprising:
at least one inlet valve and at least one exhaust valve configured to respectively allow air into and exhaust out of the at least one cylinder;
wherein the timing of opening and closing of the at least one inlet or exhaust valve may be varied to achieve a desired compression ratio or expansion ratio within the at least one cylinder.

14. The engine of claim 8, wherein the at least one cylinder is configured with a reduced wall portion at an end thereof providing a clearance between the first link and the cylinder wall as the link moves with the piston within the at least one cylinder.

15. An engine, comprising:
a crank pin;
an engine block body comprising at least one cylinder configured to sustain an internal combustion cycle;
a piston disposed within the at least one cylinder and configured to move back and forth inside the cylinder; and
a linkage;
wherein the piston is operatively coupled to the crank pin via a linkage, the linkage comprising:
a first link having a longitudinal axis and a first end operatively coupled to the piston at a first connection node and a second end operatively coupled to a first end of a second link at a second connection node, wherein the first and second connection nodes are free in translational motion and in rotary motion;
the second link having a longitudinal axis and a second end operatively coupled to a first end of a third link at a fourth connection node, wherein the fourth connection node is free in translational motion and in rotary motion;
the third link having a longitudinal axis and a second end coupled to the engine block body at a fifth connection node, such that the fifth connection node is fixed in translational motion and free in rotary motion; and
a fourth link having a longitudinal axis and a first end operatively coupled to the second link at a third connection node between the first and second ends of the second link, the fourth link including a counterweight disposed thereon, and the fourth link being coupled to the crank pin at a connection point between the third connection node and the counterweight disposed on the fourth link; and
wherein the connection point is fixed in translational motion and free in rotary motion.

16. The engine of claim 15, wherein the fourth link is configured to continually rotate along with the crank pin as the piston cycles between top dead center and bottom dead center within the at least one cylinder.

17. The engine of claim 15, wherein the second end of the third link is coupled to the engine block such that the longitudinal axis of the third link lies in the same plane as the longitudinal axis of the first link.

18. The engine of claim 15, wherein the first link is greater in length than each of the second, third, and fourth links along their respective longitudinal axes.

19. The engine of claim 15, wherein the longitudinal axis of the second link and the longitudinal axis of the fourth link lie in separate planes parallel to one another.

20. The engine of claim 15, wherein the second end of the third link is coupled to the engine block near the at least one cylinder such that the first, second, and third links form a U-shaped configuration.

21. The engine of claim 15, further comprising:
- at least one inlet valve and at least one exhaust valve configured to respectively allow air into and exhaust out of the at least one cylinder;
- wherein the timing of opening and closing of the at least one inlet or exhaust valve may be varied to achieve a desired compression ratio or expansion ratio within the at least one cylinder.

22. The engine of claim 15, wherein the at least one cylinder is configured with a reduced wall portion at an end thereof providing a clearance between the first link and the cylinder wall as the link moves with the piston within the at least one cylinder.

\* \* \* \* \*